United States Patent
Singh et al.

[11] Patent Number: 6,166,523
[45] Date of Patent: Dec. 26, 2000

[54] SMART ALTERNATOR METHOD AND APPARATUS FOR OPTIMIZING FUEL EFFICIENCY AND MONITORING BATTERIES IN AN AUTOMOBILE

[75] Inventors: Harmohan Singh, Rockaway; Stephen T. Maio, Mendham; Richard B. Huykman, Montville, all of N.J.

[73] Assignee: Honeywell International Inc., Morristown, N.J.

[21] Appl. No.: 09/481,262

[22] Filed: Jan. 11, 2000

[51] Int. Cl.$^7$ ........................................... H02J 7/00
[52] U.S. Cl. ........................... 320/132; 320/104; 324/434
[58] Field of Search ..................... 320/132, 104; 324/434

[56] References Cited

U.S. PATENT DOCUMENTS

| | | | |
|---|---|---|---|
| 5,672,951 | 9/1997 | Shiota | 320/132 |
| 5,680,050 | 10/1997 | Kawai et al. | 324/437 |
| 5,705,929 | 1/1998 | Caravello et al. | 324/430 |
| 5,721,688 | 2/1998 | Bramwell | 364/483 |
| 5,808,469 | 5/1999 | Kopera | 324/434 |
| 5,894,212 | 4/1999 | Balogh | 320/122 |
| 5,909,583 | 6/1999 | Hayes et al. | 713/300 |
| 5,990,664 | 11/1999 | Rahman | 320/136 |
| 6,011,379 | 1/2000 | Singh et al. | 320/132 |
| 6,094,030 | 5/1999 | Gunthorpe et al. | 320/116 |

*Primary Examiner*—Peter S. Wong
*Assistant Examiner*—Pia Tibbits
*Attorney, Agent, or Firm*—Loria B. Yeadon

[57] ABSTRACT

The invention provides a method and apparatus for controlling an alternator (605) by turning it ON or OFF depending upon the battery conditions and the operating conditions of the automobile monitored by various sensors (606, 609 and 611). By allowing the batteries of the automobile (610), controlled by a battery control unit (608), to charge and discharge based on its state of charge (SOC), the load imposed by the alternator (605) can be reduced such that the fuel efficiency of the automobile is optimized. By setting SOC limits, the alternator (605) can be turned ON or OFF, using an alternator control unit (604), depending on whether the SOC of the batteries is within the SOC limits. In addition, power loading limits can be preset so that the alternator (605) can be turned ON or OFF depending on the power loading conditions. The alternator (605) may be turned ON or OFF, using an alternator control unit (604), based on other conditions as well. Limits on idling speed, cruise speed, accelerating and decelerating conditions can also be preset. The alternator (605) can be turned ON or OFF based on whether the preset limits are exceeded. Since the alternator is only turned ON when needed, unnecessary charging is eliminated and the batteries of the automobile (610) operate at optimal efficiency. As a result, battery operation and fuel efficiency of the automobile are optimized.

18 Claims, 9 Drawing Sheets

SMART ALTERNATOR METHOD AND APPARATUS FOR OPTIMIZING FUEL EFFICIENCY AND MONITORING BATTERIES IN AN AUTOMOBILE

FIELD OF THE INVENTION

The invention relates to the field of control systems for automobile batteries. In particular, the invention relates to controlling the operation of an alternator to increase fuel efficiency in an automobile.

BACKGROUND OF THE INVENTION

Automotive batteries provide power for a vehicle's starting, lighting and ignition functions. In general, an automotive battery outputs a few hundred amperes of current for a few seconds of the starting period. The battery is then recharged by the charging system of the vehicle, which generally consists of an alternator, rectifier, regulator, and voltage and current controllers.

The alternator is an important instrumentality for charging automotive batteries. The design of the alternator affects the charging efficiency of the batteries and the maintenance requirements. Conventional alternators and regulators are unnecessarily wasteful in consuming fuel when operated in conjunction with batteries of an automobile. Moreover, conventional automotive battery control systems do not take into account the effects that the alternators have on battery operation and efficiency in an automobile.

A general need exists for automotive batteries to operate more efficiently. There is a need for an alternator control system that maximizes the charging efficiency of automotive batteries and which is configured such that the fuel efficiency of the automobile is optimized.

SUMMARY OF THE INVENTION

The invention provides a method and apparatus for controlling an alternator by turning it ON or OFF depending upon the battery conditions and the operating conditions of the automobile. By allowing the batteries of the automobile to charge and discharge based on its state of charge (SOC), the load imposed by the alternator can be reduced such that the fuel efficiency of the automobile is optimized. By setting SOC limits, the alternator can be turned ON or OFF depending on whether the SOC of the batteries is within the SOC limits. Since the alternator is only turned ON when needed, unnecessary charging is eliminated and the batteries of the automobile operate at optimal efficiency. As a result, energy is saved and fuel efficiency of the automobile is optimized.

In addition, power loading limits can be preset so that the alternator can be turned ON or OFF depending on the power loading conditions. The alternator may be turned ON or OFF based on other conditions as well. Limits on idling speed, cruise speed, accelerating and decelerating conditions can also be preset. The alternator can be turned ON or OFF based on whether the preset limits are exceeded. Battery operation and fuel efficiency are similarly optimized as a result.

BRIEF DESCRIPTION OF THE DRAWINGS

These and other advantageous features of the invention can be understood from the following detailed description together with the accompanying drawings, in which.

DETAILED DESCRIPTION OF THE INVENTION

Figure 1:
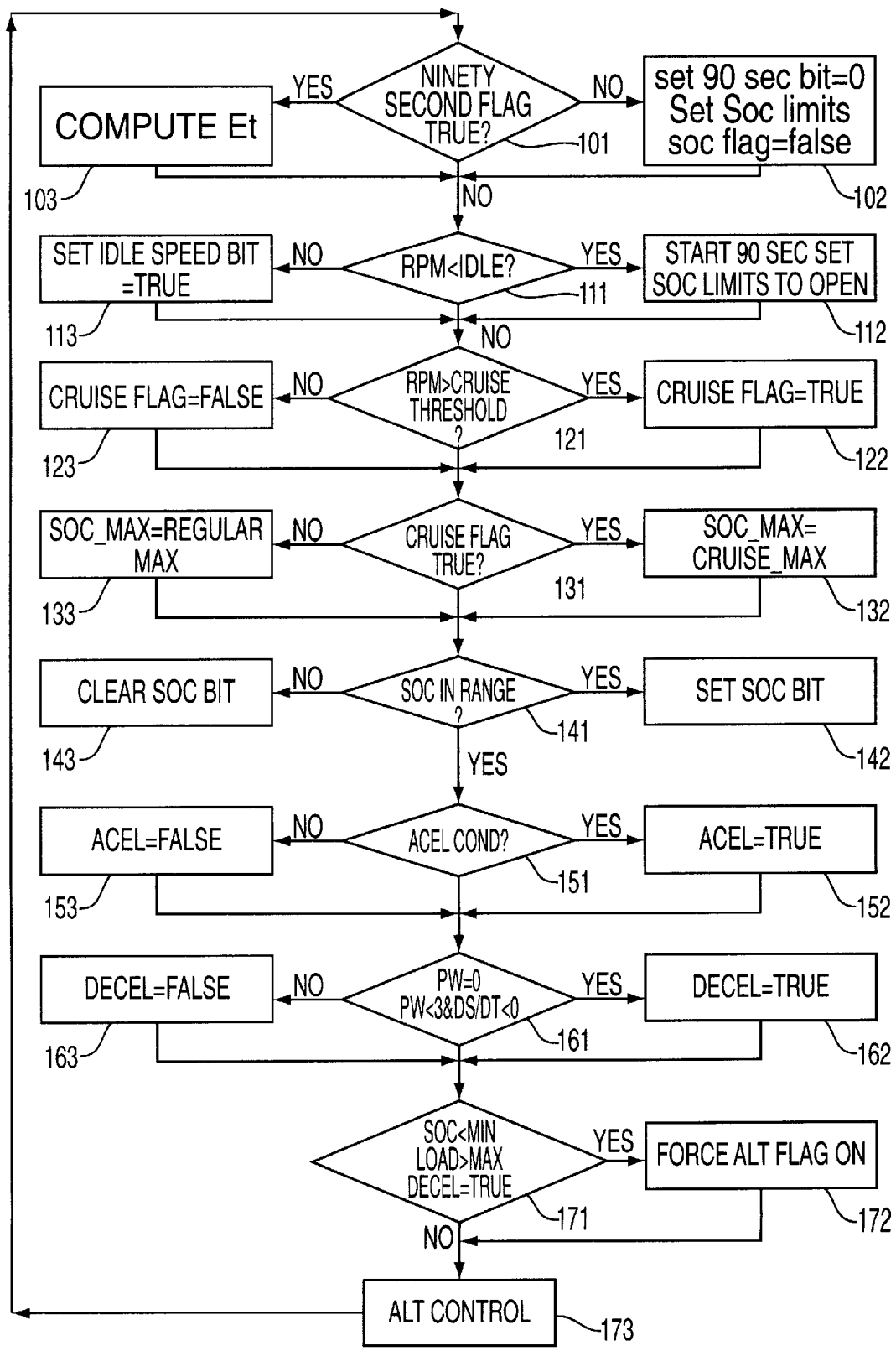
FIG. 1 is a flow diagram illustrating the methodology of the invention.

The invention provides a methodology for optimizing battery performance in an automobile by turning the alternator ON or OFF based on certain battery and automotive conditions, such as the battery state of charge (SOC), power loading, and acceleration/deceleration. FIG. 1 is a flow diagram of a control method in accordance with the invention for optimizing battery performance in an automobile having at least one alternator and at least one battery. Referring to the figure, in Step 101, a 90-second time period is provided for the batteries of the automobile to charge up. The passing of the 90-second time period is indicated by a Ninety Second Flag. If Ninety Second Flag is TRUE, then the SOC (state of charge) flag is set to FALSE and a 90-second bit is set to 0 in Step 102. If Ninety Second Flag is not TRUE, then $E_t$, which is the estimated time the automotive battery needs to charge up, is computed in Step 103. The control is then transferred to Step 111.

Referring to Step 111, the RPM (revolution per minute) of the automobile is monitored and tested against an idle speed (Idle). The idle speed (Idle) is set at an RPM where the automobile engine is idling. If the RPM of the automobile is above the idle speed (Idle), the SOC limit is set to OPEN, and another 90-second period is started for the automotive battery to charge up in Step 112. If the RPM is not above the idle speed (Idle), the Idle speed bit is set to TRUE in Step 113. The control is then forwarded to Step 121.

Referring to Step 121, the RPM is monitored and tested against a Cruise Threshold. If the RPM is above Cruise Threshold, a Cruise Flag is set to TRUE in Step 122. If the RPM is not above Cruise Threshold, Cruise Flag is set to FALSE in Step 123. The control is then transferred to Step 131.

Referring to Step 131, if Cruise Flag is TRUE, then the SOC maximum value (SOC_MAX) is set to the maximum cruise value (Cruise_MAX) in Step 132. If Cruise Flag is not TRUE, then the SOC maximum value (SOC_MAX) is set to the regular maximum value (Regular MAX) in Step 133. The control is then forwarded to Step 141.

Referring to Step 141, the SOC of the automotive battery is monitored and tested against a Range of the SOC. The SOC can be monitored by coupling a current sensor to the battery. If the SOC is in Range, then a SOC Bit is set in Step 142. If the SOC is not in Range, then SOC Bit is cleared in Step 143. The control is then transferred to Step 151.

Referring to Step 151, the automobile is then tested to see if it is in an accelerating condition (Acel Cond). The acceleration condition can be monitored by coupling a current sensor to the fuel injector of the automobile. If the automobile is determined to be in an accelerating condition, then an Acel Flag is set to TRUE in Step 152. If the automobile is not in the accelerating condition, then Acel Flag is set to FALSE in Step 153. The control is then forwarded to Step 161.

Referring to Step 161, the automobile is monitored to see if it is decelerating. Parameters such as power (PW) and speed (ds/dt) are tested to determine if the automobile is in a decelerating condition. If it is decelerating, then a Decel Flag is set to TRUE in Step 162. If the automobile is not decelerating, then Decel Flag is set to FALSE in Step 163. The control is then transferred to Step 171.

Further testing of parameters is performed in Step 171. Referring to that step, the SOC is tested to determine if it is below a minimum value (MIN). The power loading (Load) is tested to determine if it is above a maximum value (MAX). If the Decel Flag is TRUE, the SOC is below the minimum value (MIN) and the power loading (Load) is above the maximum value (MAX), then the alternator flag (Alt Flag) is set to ON in Step 172. The control is then transferred to Step 173. All the testing results and flag conditions are forwarded to ALT Control (173) for further control processing. A looping structure is formed between ALT Control 173 and the beginning of the algorithm of the invention in Step 101. After ALT Control 173, the control is transferred to Step 101 due to the continuous operational loop.

Figure 2:
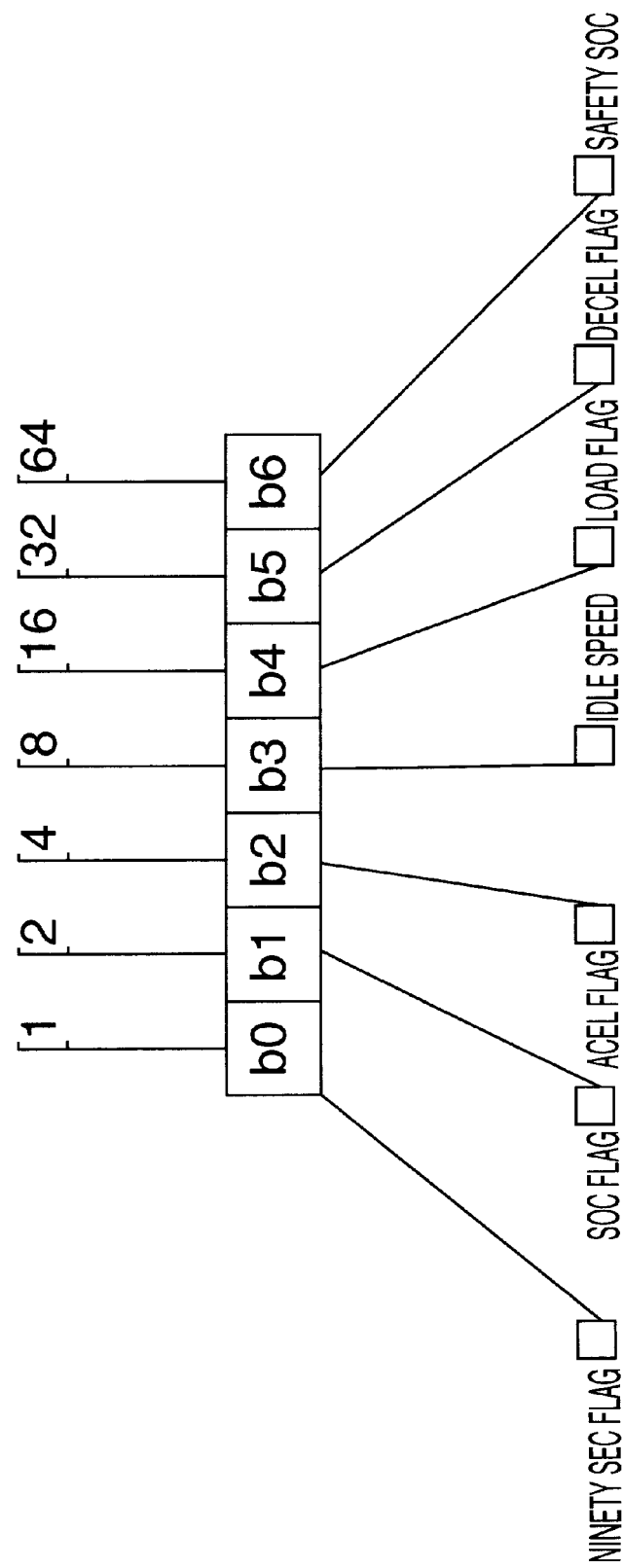
FIG. 2 illustrates the control flags used in the control process of the invention.

FIG. 2 illustrates the control flags used in the invention, and particularly the ones used in the process steps of the control method shown in FIG. 1. The flags, i.e., Ninety Second Flag, SOC Flag, Acel Flag, Idle Flag, Load Flag, Decel Flag and Safety SOC Flag, which are also shown in FIG. 1, are stored into memory in Bits 0–6, respectively. Bits 0–3 turn the alternator ON or OFF depending on specific circumstances. If anyone of Bits 4–6 is ON, the alternator is automatically turned ON.

Figure 3:
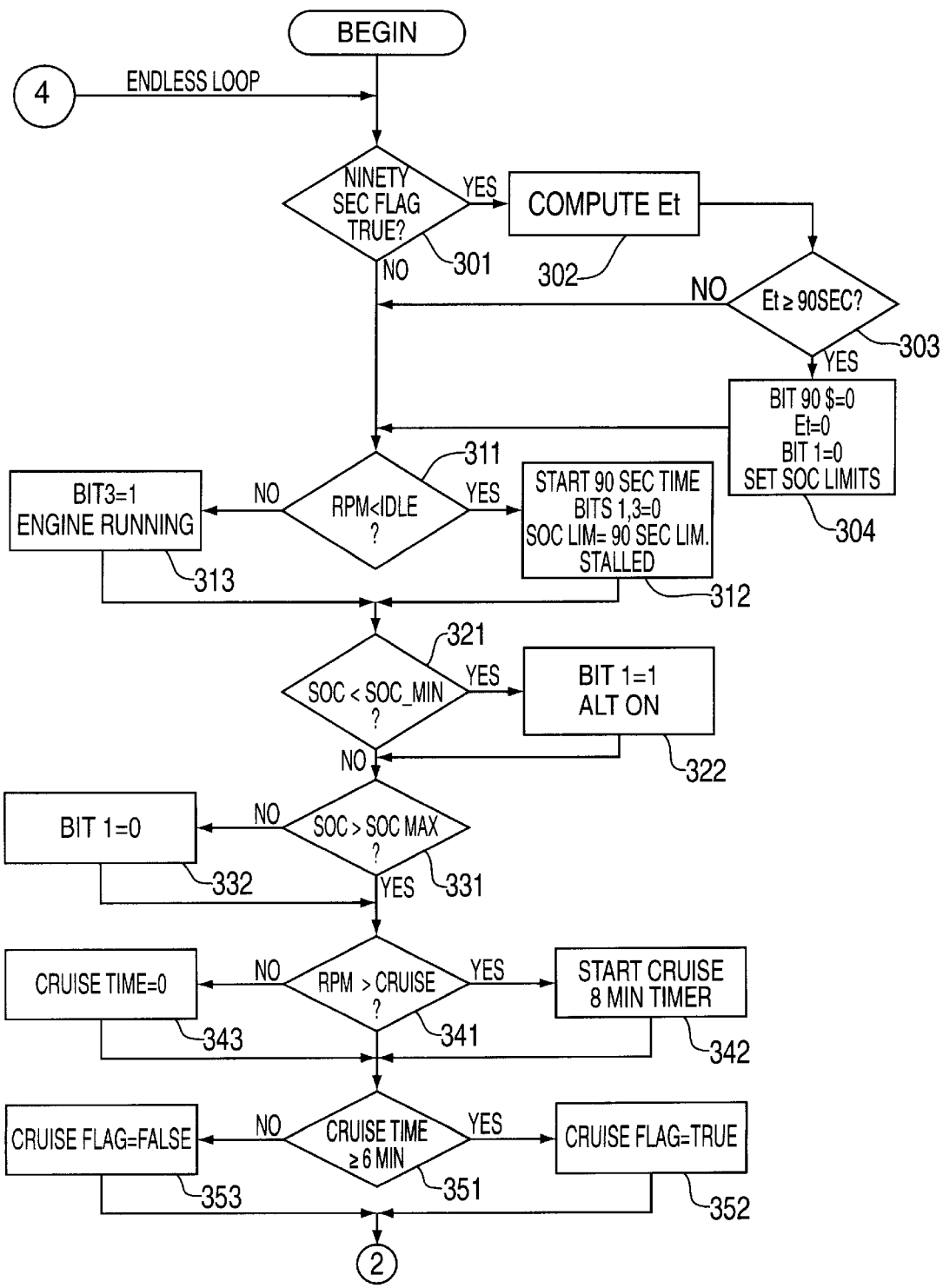
FIGS. 3, 4 and 5 are flow diagrams that illustrate the methodology of the invention in further detail.
Figure 4:
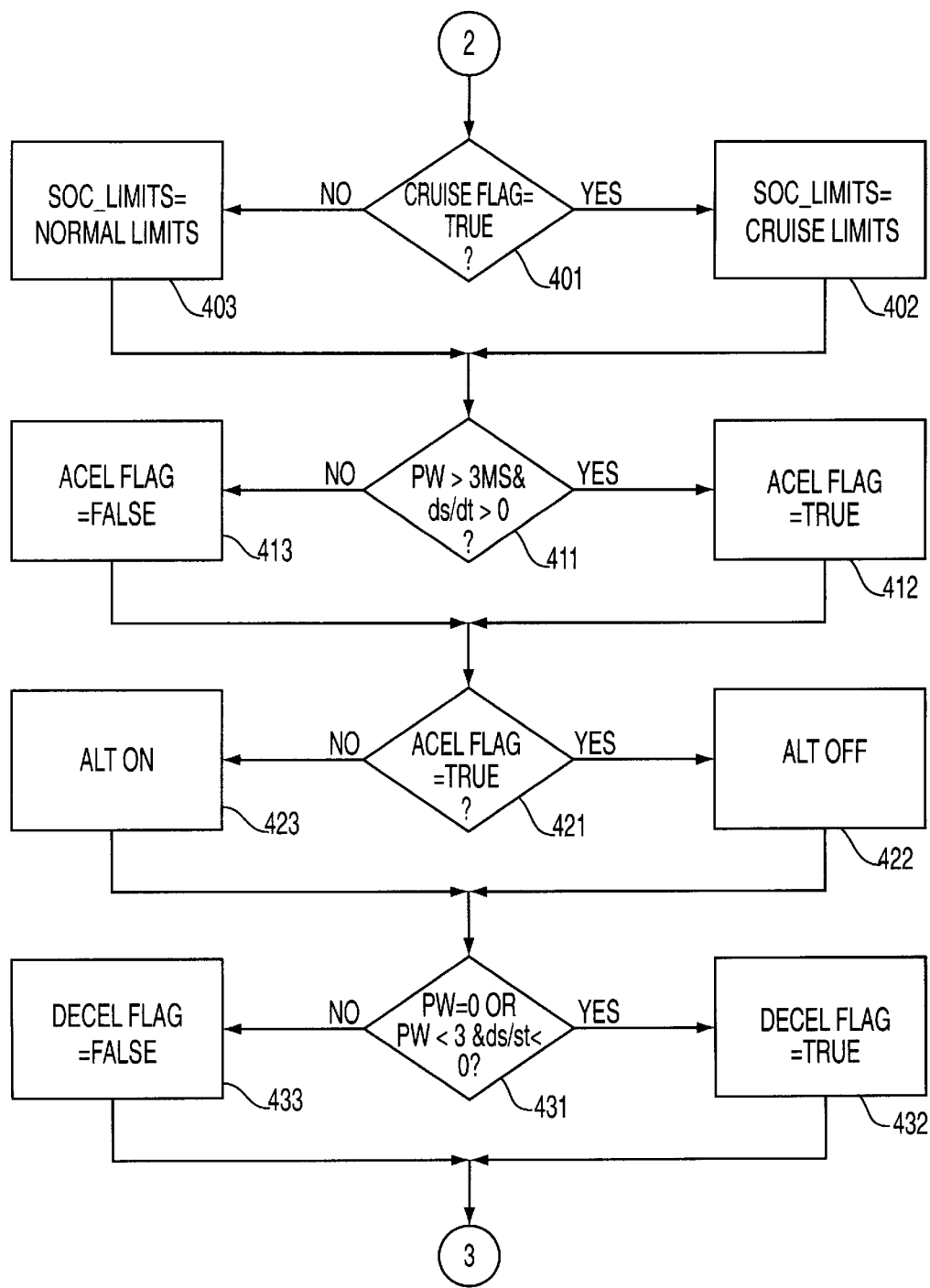
Figure 5:
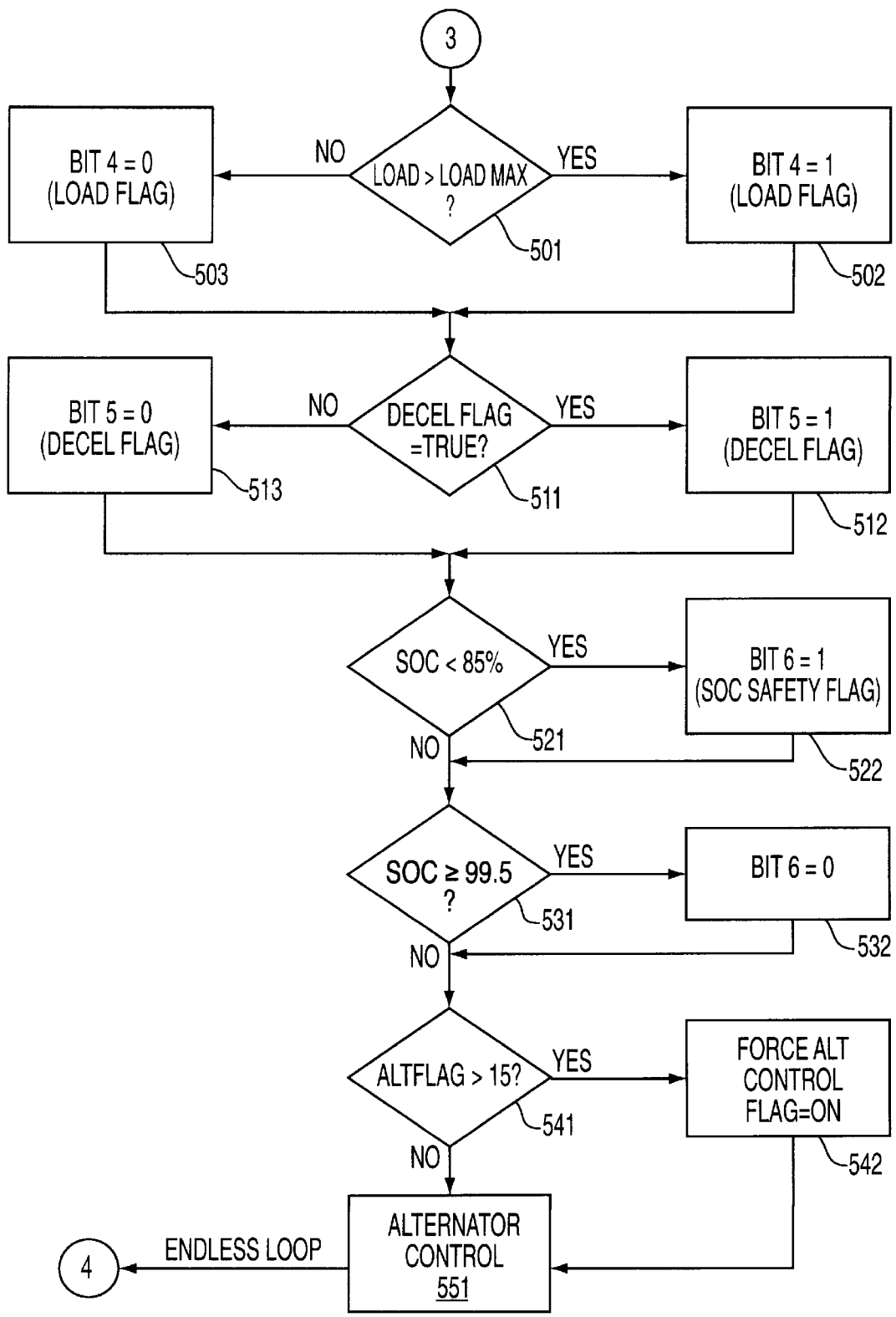

FIGS. 3, 4 and 5 are flow diagrams that illustrate the control method of the invention, and particularly the use of the control flags, in further detail. Note that FIGS. 3, 4 and 5 are to be viewed in conjunction with each other, as each figure only shows a portion of a complete flow diagram illustrating the detailed steps in the invention.

Referring to FIG. 3, the first flag (Ninety Second Flag) is checked to see if it is set to TRUE in Step 301. If Ninety Second Flag is TRUE, then $E_t$ is computed in Step 302. If Ninety Second Flag is not TRUE, then the control is forwarded to Step 311. After Step 302, the control is transferred to Step 303 where $E_t$ is monitored and tested. If $E_t$ is greater or equal to 90 seconds, then the SOC limits (SOC_MIN and SOC_MAX) are set, Bit 1 (SOC Flag) is set to 0, $E_t$ is set to zero and Bit 0 is set to 0). SOC limits can be set at a minimum and a maximum, e.g., 85 percent and 99.5 percent for SOC_MIN and SOC_MAX, respectively. If $E_t$ is not greater or equal to 90 seconds, then the control is forwarded to Step 311. After Step 304 is complete, the control is similarly transferred to Step 311.

Referring to Step 311, the RPM of the automobile is monitored and tested. If the RPM is less than the idling speed (Idle), then in Step 312 the 90-second time period begins to allow the batteries of the automobile to charge up, Bit 1 and Bit 3 are set to 0, the engine of the automobile is determined to be stalled. The SOC limits are then set to 90-second limits, e.g., a minimum state of charge is set to a 90-second limit, appropriate for the stalled engine. The 90 second limits can be preset or programmed into the control units of the apparatus of the invention. If the RPM is not less than the idling speed (Idle), then in Step 313 Bit 3 is set to 1 and the engine of the automobile is determined to be running. The control is then transferred to Step 321.

Referring to Step 321, the battery state of charge (SOC) is monitored and tested against a minimum SOC value (SOC_MIN). If SOC is less than SOC_MIN, then Bit 1 is set to 1 and the alternator of the automobile is turned ON in Step 322. If SOC is not less than SOC_MIN, then the control is forwarded to Step 331.

Referring to Step 331, SOC is monitored and tested against a maximum SOC value (SOC_MAX). If SOC is greater than SOC_MAX, then Bit 1 is set to 0 and the alternator of the automobile is turned OFF in Step 332. If SOC is not greater than SOC_MAX, then the control is transferred to Step 341.

Referring to Step 341, the RPM of the automobile engine is monitored and tested against a cruise speed (Cruise). If the RPM is greater than the cruise speed (Cruise), then cruise control of the automobile is started for six minutes in Step 342. The 6-minute timer monitors and marks the 6-minute cruise period. If the RPM is not greater than the cruise speed (Cruise), the control is forwarded to Step 343 and no cruise control is started and the cruise time is zero. The control is then transferred to Step 351.

Referring to Step 351, the cruise time of the automobile (Cruise Time) is monitored and tested against a 6-minute period. If Cruise Time is greater or equal to six minutes, then Cruise Flag is set to TRUE in Step 352. If Cruise Time is less than six minutes, then Cruise Flag is set to FALSE in Step 353. The control is then forwarded to 2, which is described in further detail in FIG. 4.

FIG. 4 is another flow diagram that illustrates a portion of the methodology of the invention. Referring to Step 401, where control is transferred from Step 352 or Step 353 of FIG. 3, Cruise Flag is checked to see if it is set to TRUE., i.e., if the automobile is cruising. If Cruise Flag is TRUE, then the SOC limits (SOC_Limits) are set to the cruise limits of the automobile in Step 402. If Cruise Flag is not TRUE, then the SOC limits (SOC_Limits) are set to the normal limits in Step 403. Both the cruise limits and the normal limits can be pre-set. The control is then forwarded to Step 411.

Referring to Step 411, the power (PW) and speed (ds/dt) are tested. If PW is greater than 3 ms and ds/dt is greater than zero, then the acceleration flag (Acel Flag) is set to TRUE in Step 412. If PW is not greater than 3 ms and ds/dt is not greater than zero, then Acel Flag is set to FALSE in Step 413. The control is then transferred to Step 421.

Referring to Step 421, Acel Flag is tested to see if it is set to TRUE. If Acel Flag is TRUE, then the alternator of the automobile is turned OFF in Step 422. If Acel Flag is not TRUE, then the alternator is turned ON in Step 423. Then control is then forwarded to Step 431.

Referring to Step 431, if PW is equal to zero or less than three, and ds/dt is less than zero, then the deceleration flag (Decel Flag) is set to TRUE in Step 432. If PW is not equal to zero or less than three, and ds/dt is not less than zero, then Decel Flag is set to FALSE in Step 433. The control is then transferred to 3, which is described in further detail in FIG. 5.

FIG. 5 is yet another flow diagram that illustrates a portion of the methodology of the invention. Referring to Step 501, where control is transferred from Step 432 or Step 433 of FIG. 4, the power load (Load) is tested against a maximum load value (Load Max). If Load is greater than Load Max, then Bit 4 (Load Flag) is set to 1 in Step 502. If Load is not greater than Load Max, then Bit 4 is set to 0 in Step 503. The control is then forwarded to Step 511.

Referring to Step 511, Decel Flag is tested to see if it is set to TRUE. If Decel Flag is TRUE, then Bit 5 (Decel Flag) is set to 1 in Step 512. If Decel Flag is not TRUE, then Bit 5 is set to 0 in Step 513. The control is then transferred to Step 521.

Referring to Step 521, the battery state of charge (SOC) is tested to see if it is less than 85 percent. If SOC is less then 85 percent, then Bit 6 (SOC Safety Flag) is set to 1 in Step 522. The control is then forwarded to Step 531, where SOC is tested to see if it is greater or equal to 99.5 percent. If SOC is greater or equal to 99.5 percent then Bit 6 is set to 0 in Step 532. The control is transferred to Step 541.

Referring to Step 541, the alternator flag (Alt Flag) is tested. If Alt Flag is greater than 15, then the alternator control flag (Alt Control Flag) is turned ON in Step 542. The control is then forwarded to Alternator Control 551, which is in an operational loop with 4 that starts the entire process of the invention again, beginning with Step 301 of FIG. 3. Note that Alternator Control 551 serves the same function as ALT Control 173 of FIG. 1.

The methodology of the invention, as described herein above, conserves energy and optimizes fuel efficiency in operating an automobile having an alternator. Since the alternator is only turned ON when needed, unnecessary charging is eliminated and the batteries of the automobile operate at optimal efficiency. As a result, battery operation and fuel efficiency are optimized.

Reference is now made in detail to a preferred embodiment of the apparatus of the invention herein below. The process steps and algorithms according to the invention, as described herein above, are implemented in the apparatus of the invention which is installed in an automobile. The invention provides an apparatus for optimizing battery performance in an automobile by turning the alternator ON or OFF based on certain battery and automotive conditions, such as the battery state of charge (SOC), power loading, acceleration/deceleration. The apparatus of the invention is easily implemented in an automobile using existing alternator, displays and controls. A preferred embodiment of the apparatus of the invention, a stand-alone electronics module, fits into the automotive environment by utilizing existing housing structures in the automobile. The apparatus of the invention utilizes existing audible and visual status indicators associated with alarms and annunciators (such as the ones in a keyless remote-entry alarm system) in the automobile to provide service warnings to charge or replace the battery. No additional wires are needed to penetrate the firewall from the engine compartment into the passenger compartment. Also, no additional displays are needed in the passenger compartment. As a result, cost and weight are minimized and a minimal number of connectors and wires are required to interface with the electrical system of the automobile. Furthermore, as a single functional circuit package, electronic components and cost in installing the apparatus in the automobile are minimized as well.

Figure 6:
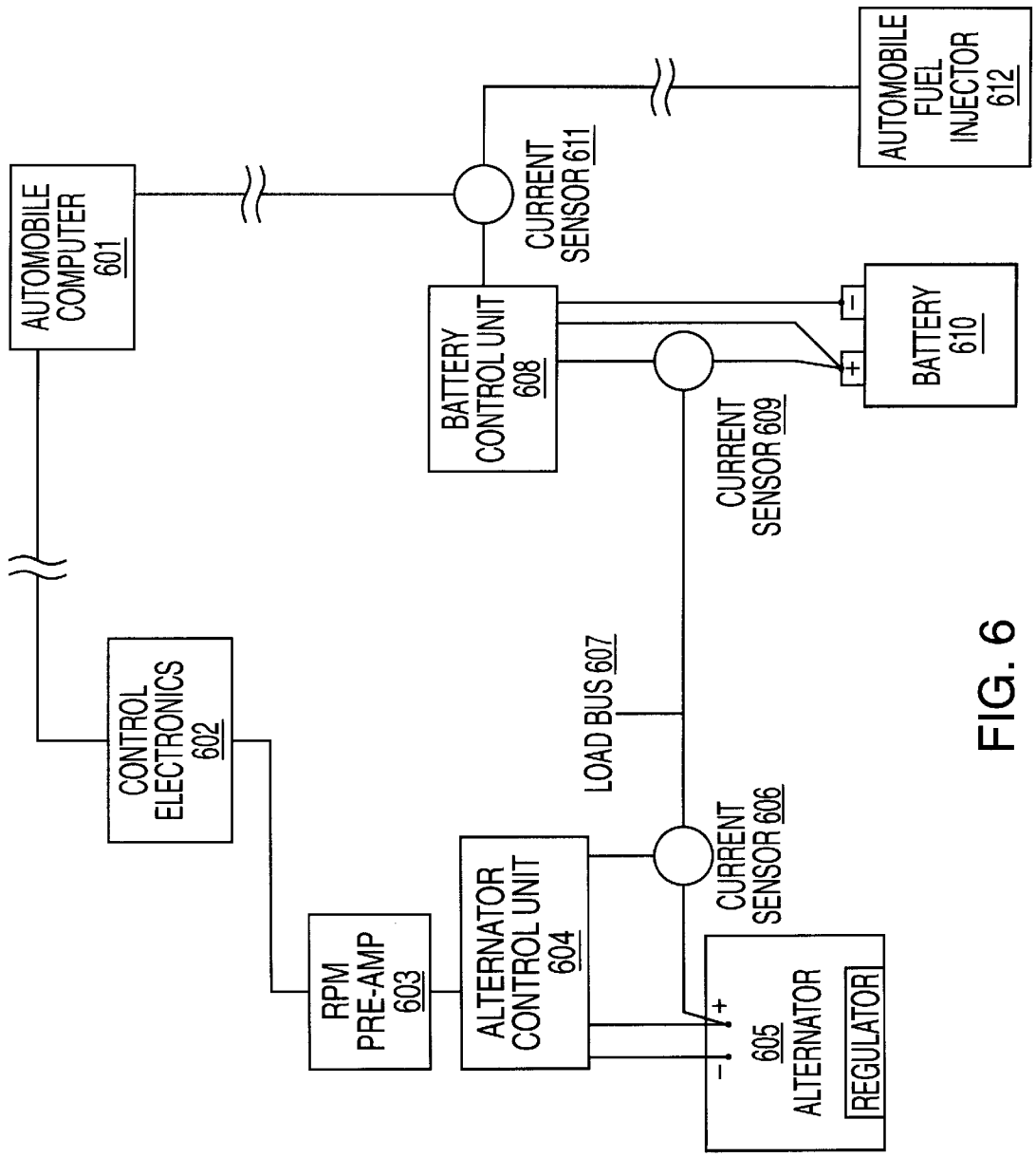
FIG. 6 is a schematic of an illustrative embodiment of the apparatus of the invention.

FIG. 6 is a schematic diagram of an illustrative embodiment of the invention in a single functional circuit package. Referring to the figure, the single functional circuit package includes a Control Electronics 602, an Alternator Control Unit 604, a Battery Control Unit 608, and various sensors for monitoring battery and automotive conditions. Control Electronics 602, where control steps and algorithms of the invention are embedded, is coupled to Automobile Computer 601, which can be an existing computer in the automobile. Control Electronics 602 can forward information to Automobile Computer 601 for display or processing within its existing structures. Control Electronics 602 is also coupled to RPM Pre-Amp 603, where signals representing the RPM of the automobile are pre-amplified. RPM Pre-Amp 603 is needed since the signal representing the RPM of the automobile is very low when Alternator 605 is off. RPM Pre-Amp 603 is coupled to Alternator Control Unit 604, which controls the Alternator/Regulator 605. Alternator Control Unit 604 serves the same function as ALT Control 173 of FIG. 1 and Alternator Control 551 of FIG. 5. Current Sensor 606, which is coupled with the positive terminal of Alternator/Regulator 605, monitors the current conditions of Alternator/Regulator 605, which are used for monitoring and processing diagnostic factors in the process steps according to the invention. Load Bus 607 provides the power loading for the apparatus of the invention as embodied in FIG. 6. Current Sensor 609 monitors the current conditions of Battery 610, which are similarly used for monitoring and processing diagnostic factors in the process steps according to the invention.

Battery Control Unit 608, which is coupled with the positive and negative terminals of Battery 610, controls the diagnostic functions of Battery 610, such as the state of charge (SOC) and internal resistance (IR) conditions and the corresponding maintenance actions, if needed. Current Sensor 611, which is coupled to Automobile Fuel Injector Module 612, monitors the current conditions and provides acceleration/deceleration information on the automobile. Note that Battery Control Unit can similarly forward information to Automobile Computer 601 for display or processing. Automobile Computer 601, through existing audio and panel displays coupled thereto, notifies the operator of the automobile to take maintenance actions on the battery, thereby ensuring reliable automotive operation.

Preset limits (e.g., state of charge, power loading and acceleration/deceleration limits) can be programmed into the various control units as described herein or any setting control otherwise available in the art. The apparatus of the invention can monitor battery and automobile conditions and test them against the preset limits. Note that the apparatus of the invention as embodied in a stand-alone electronic module, as described herein, implements the method of the invention in an automobile using existing alternator and warning structures therein. In an alternative to the embodiment of the stand-alone electronic module, the process steps and algorithms according to the invention may be directly programmed into the on-board computer of the automobile. In the alternative embodiment, the process steps and algorithms according to the invention are implemented by the on-board computer of the automobile. An electronic module installed in the engine compartment of the automobile then acts as the hardware that carries out the process steps and algorithms as instructed by the on-board computer.

Figure 7:
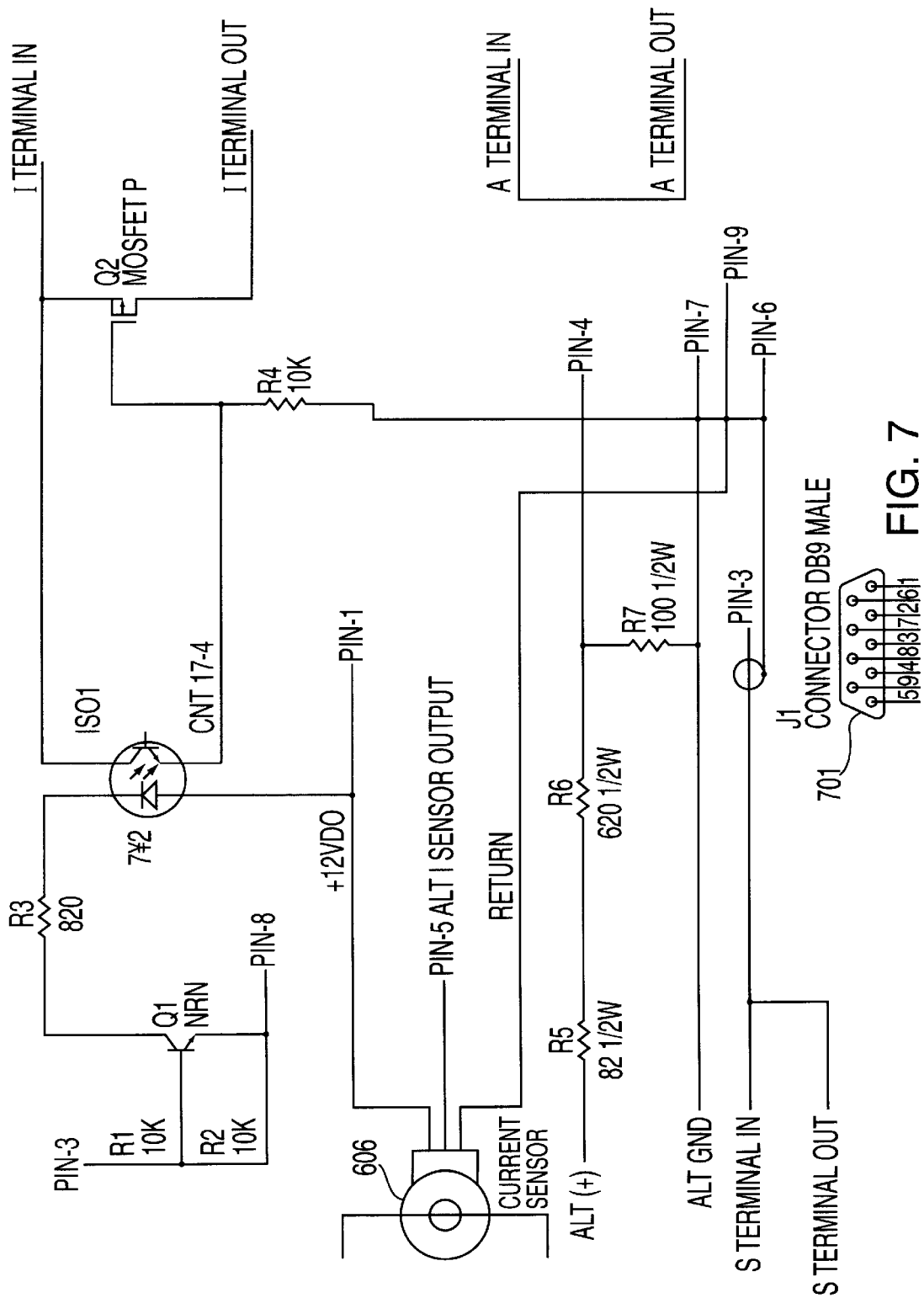
FIGS. 7, 8 and 9 are microelectronic schematics illustrating various parts of an embodiment of the apparatus of the invention in further detail.

FIG. 7 is a detailed schematic illustrating the microelectronic components of an Alternator Control Unit 604. Alternator Control Unit is coupled to the Current Sensor 606, coupled to Alternator/Regulator 605. In FIG. 7 a J1 Connector DB9 Male (701) is a 9-pin output of the Alternator Control Unit 604, which output is coupled to a matching female connector (not shown) of RPM Pre-Amp 603 of FIG. 6.

The output from Current Sensor 606 is coupled to Pin-1, Pin-5 and Pin-9. In particular, the lead to Pin-9 provides a return path to Current Sensor. The lead to Pin-5 outputs the current conditions monitored by Current Sensor, i.e., Alt I Sensor Output. The lead to Pin-1 provides a 12-volt direct current (DC) voltage. The lead to Pin-1 is also coupled to the anode of the PN junction diode at 702. 702, an opto-coupler, is a combined PN junction photo-diode and bipolar junction photo-transistor (BJT), which can be variably controlled by Alternator Control Unit 604. The cathode of the PN junction diode at 702 is serially coupled to R3 and the collector of Q1, another BJT.

The lead to Pin-2 is coupled to R1, which is coupled to R2 and the base of Q1. Both R2 and the emitter of Q1 are coupled to Pin-8. The collector of the BJT at 702 is coupled to I Terminal In and also the drain of Q2. Q2 is a metal-oxide semiconductor field-effect transistor or MOSFET. In particular, Q2 is a P-channel enhancement-type MOSFET. The source of Q2 is coupled to I Terminal Out. The emitter of the BJT at 702 is coupled to the gate of Q2 and also R4. R4 is in turn coupled to Pin-6, Pin-7 and Pin-9. The lead to Pin-7 is also coupled to the ground of the Alternator/Regulator 605, i.e., Alt Gnd. Pin-3 is coupled to S Terminal In and S Terminal Out. The S Terminal is connected to one of the unrectified faces of Alternator 605. R7, which is connected to Alt Gnd, is coupled to Pin-4. Pin-4 is also coupled, in series, to R6, R5 and the positive terminal of the Alternator/Regulator 605, i.e., Alt (+).

Figure 8:
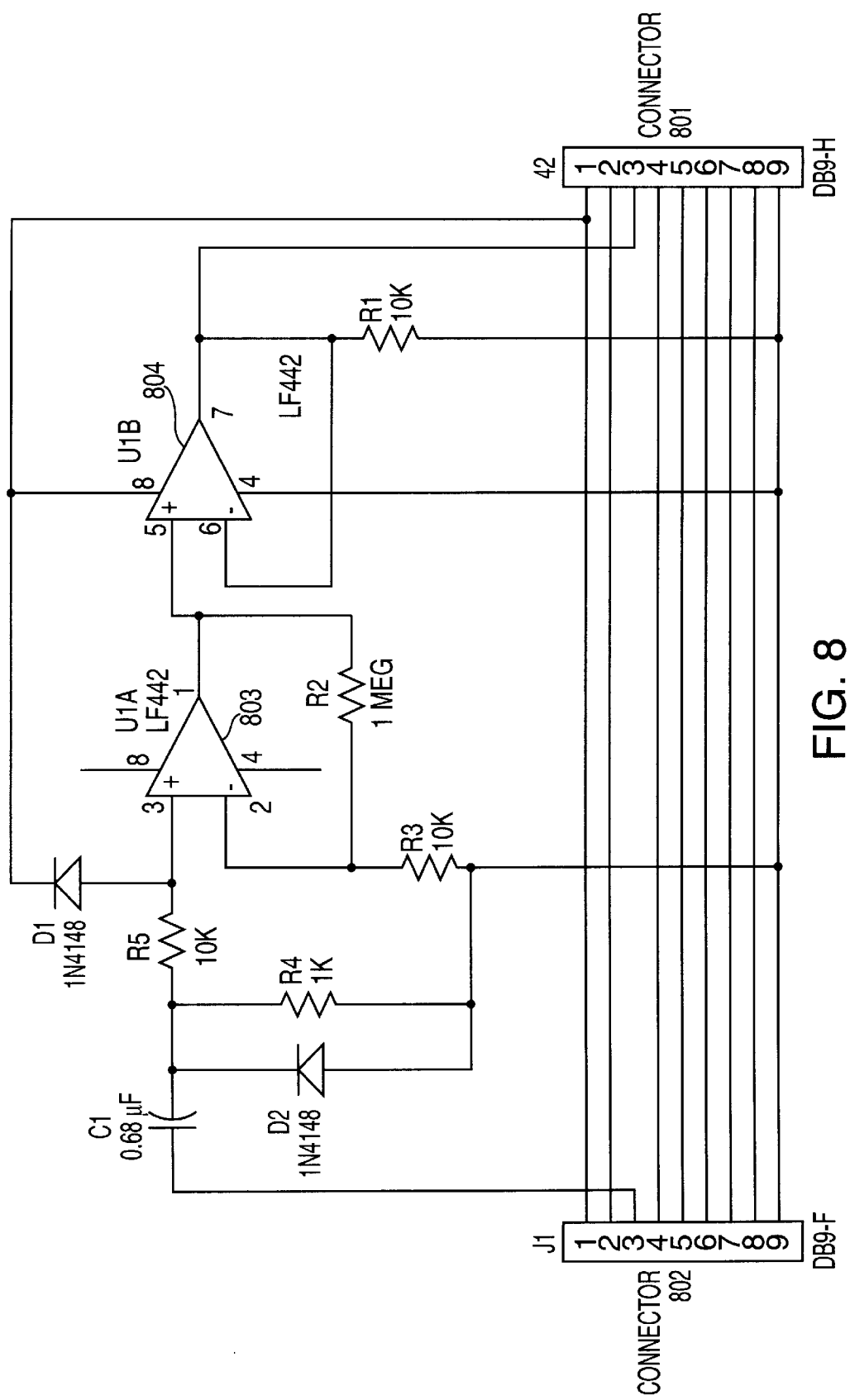

FIG. 8 is a detailed microelectronic schematic of an illustrative embodiment of the RPM Pre-Amp 603 of FIG. 6. Referring to FIG. 8, RPM Pre-Amp includes two 9-pin connectors, 801 and 802. Connector 801 is a male connector coupled to a matching female connector (not shown) coupled with Control Electronics 602 of FIG. 6. Connector 802 is a female connector coupled to a matching male connector (not shown) at Alternator Control Unit 604. Pins 2 and 4–8 of Connector 801 are directly coupled with Pins 2 and 4–8 of Connector 802, respectively. In particular, Pin-5 of Connectors 801 and 802 is coupled to Pin-5 of Connector 701 of FIG. 7, which outputs the current conditions monitored by Current Sensor 606. Pin-9 of Connectors 801 and 802 is connected with Pin-9 of Connector 701 of FIG. 7, which provides a return path for the Current Sensor 606.

Pin-3 of Connector 802 is serially coupled with C1. C1 is coupled with the cathode of PN junction diode D2. D2 is in parallel with R4, which is coupled with R5. R5 is coupled with the anode of PN junction diode D1 and the noninverting input 3 of operational amplifier (Op Amp) 803. The cathode of D1 is coupled with Pin-1 of Connector 801. The inverting input 2 of Op Amp 803 is coupled to R3, which is connected to the anode of D2, R2 and R4. R3 is also coupled to Pin-9 of Connectors 801 and 802. The inverting input 2 of Op Amp 803 is serially coupled with R2 and the output 1 of Op Amp 803, which is in turn coupled with the noninverting input 5 of Op Amp 804. The inverting input 6 of Op Amp 804 is coupled with the output 7 of Op Amp 804, which is connected to R1. R1 is coupled to Pin-9 of Connectors 801 and 802.

Figure 9:
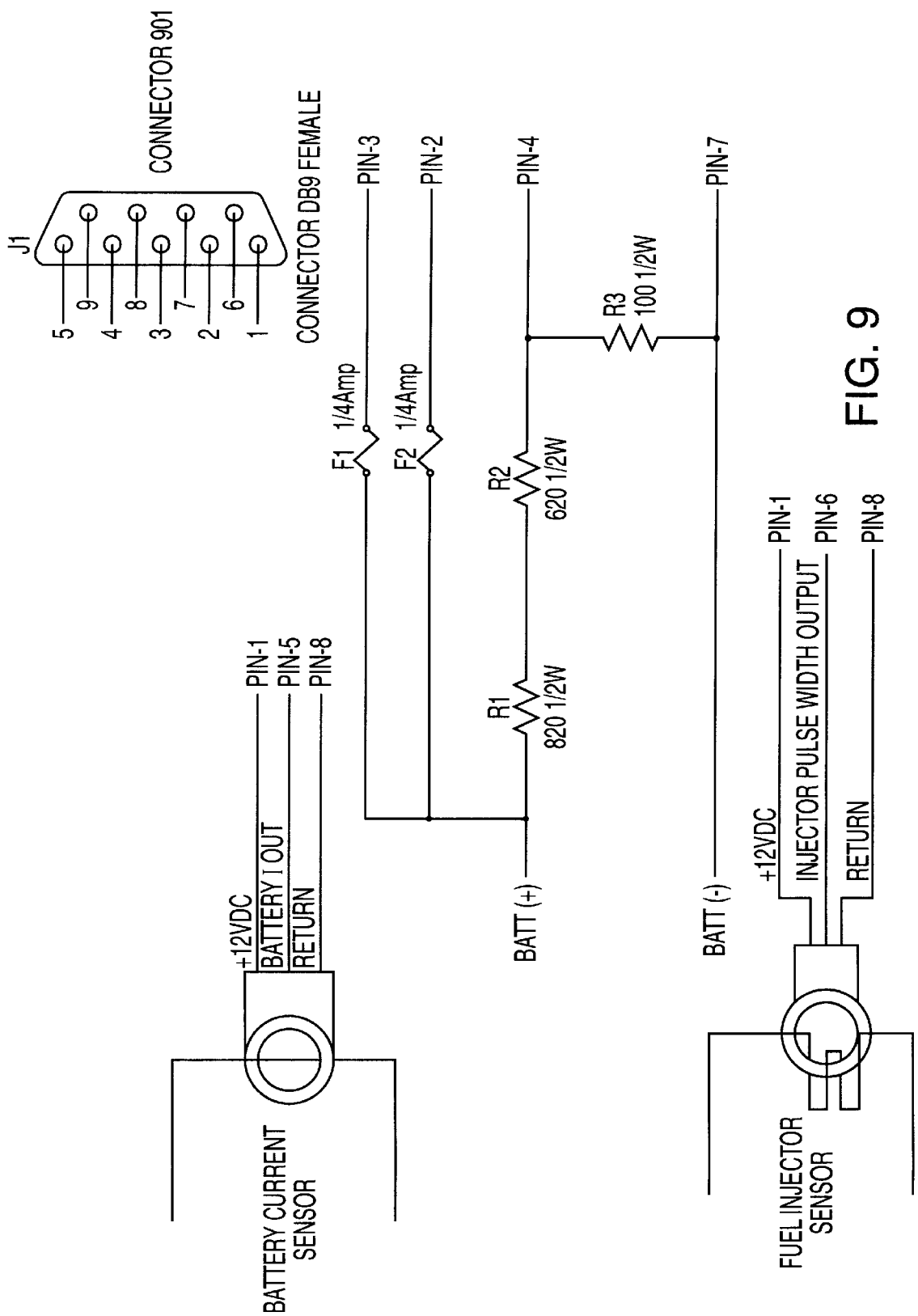

FIG. 9 is a detailed microelectronic schematic of an illustrative embodiment of Battery Control Unit 608. Referring to FIG. 9, Battery Control Unit 608 Current Sensor 609 and a Fuel Injector Current Sensor 611. Referring to Connector 901, which is a 9-pin female connector, Pin-1, Pin-5 and Pin-8 are connected to Battery Current Sensor 608, and Pin-1, Pin-6 and Pin-8 to Fuel Injector Sensor 611. The lead to Pin-1 of Connector 901 provides a 12-volt DC voltage to, and the lead to Pin-8 a return path for both Battery Current Sensor 608 and Fuel Injector Sensor 611. The lead to Pin-5 outputs the current conditions monitored by Battery Current Sensor 611, i.e., Batt I Out. The lead to Pin-6 outputs the acceleration/deceleration conditions monitored by Fuel Injector Sensor 611, i.e., Injector Pulse Width Output.

Battery Control Unit 608 is also connected with the positive and negative terminals of Battery 610, i.e., Batt (+) and Batt (−), respectively. Pin-7 of Connector 901 is coupled with Batt (−) and R3, which is also coupled with Pin-4 and R2. R2 is serially connected to R1, and also Batt (+). Pin-3 is connected to F1, which is also coupled with R1 and Batt (+). Pin-2 is coupled with F2, which is also connected to R1 and Batt (+).

The apparatus of the invention, as shown herein above in block diagram form and also in schematic detail, is a stand-alone electronics module that easily complements and fits into existing alternator and other structures of the automobile. As a result, cost and weight are minimized and a minimal number of connectors and wires are required to interface with the electrical system of the automobile. In particular, the apparatus of the invention utilizes existing audible and visual status indicators associated with alarms and annunciators (such as the ones in a keyless remote-entry alarm system) in the automobile to provide service warnings to charge or replace the battery. Furthermore, as a single functional circuit package, electronic components and cost in installing the apparatus in the automobile are minimized as well.

In an alternative to the preferred embodiment of the apparatus of the invention as described herein above, additional electronics can be built to provide an audible alarm and visual warning displays separate from existing audio and visual warning components of the automobile. The alternative embodiment requires additional electrical connections and a separate housing for the alarm and warning displays. Modification of the wiring system of the automobile is needed as well. It is nonetheless noted that the preferred embodiment of the apparatus of the invention is the one that utilizes audio and visual alarm and warning interface and system which are pre-existent in the automobile.

While the invention has been particularly shown and described with reference to the preferred embodiments thereof, the embodiments are not intended to be exhaustive or to limit the invention to the precise forms disclosed herein above. It will be understood by those skilled in the art that various changes in form and detail may be made therein without departing from the spirit and scope of the invention. Similarly, any process steps described may be interchangeable with other steps in order to achieve the same result. It is intended that the scope of the invention is defined by the following claims and their equivalents.

We claim:

1. A method for optimizing battery performance in an automobile having an alternator and a battery, comprising the steps of:
   monitoring state of charge of the battery;
   setting state of charge limits; and
   turning off the alternator if the state of charge exceeds the state of charge limits.

2. The method of claim 1, further comprising the steps of:
   monitoring power loading of the battery;
   setting power loading limits; and
   turning on the alternator if the power loading exceeds the power loading limits.

3. The method of claim 1, further comprising the steps of:
   monitoring deceleration of the automobile;
   setting deceleration limits; and
   turning on the alternator if the deceleration exceeds the deceleration limits.

4. The method of claim 1, further comprising the steps of:
   setting the state of charge limits to cruise limits if speed of the automobile exceeds a cruise speed; and
   setting the state of charge limits to normal limits if the speed of automobile does not exceed the cruise speed.

5. The method of claim 1, further comprising the steps of:
   setting the state of charge limits to cruise limits if speed of the automobile exceeds a cruise speed for a preset time limit; and setting the state of charge limits to normal limits if the speed of the automobile does not exceed the cruise speed for the preset time limit.

6. A method for optimizing battery performance in an automobile having an alternator and a battery, comprising the steps of:

turning on the alternator if state of charge of the battery is less than a minimum state of charge;

turning on the alternator if power loading of the battery exceeds a maximum power load; and turning on the alternator if deceleration of the automobile exceeds a preset limit.

7. The method of claim 6, further comprising the step of turning off the alternator if the state of charge exceeds a maximum state of charge.

8. The method of claim 6, further comprising the step of turning off the alternator if acceleration of the automobile exceeds a preset limit.

9. The method of claim 6, further comprising the steps of:

setting the minimum state of charge to a cruise limit if speed of the automobile exceeds a cruise speed; and setting the minimum state of charge to a normal limit if the speed of automobile does not exceed the cruise speed.

10. The method of claim 6, further comprising the steps of:

setting the minimum state of charge to a cruise limit if speed of the automobile exceeds a cruise speed for a preset time limit; and setting the minimum state of charge to a normal limit if the speed does not exceed a cruise speed for a preset time limit.

11. The method of claim 6, further comprising the step of setting the minimum state of charge corresponding to a 90-second limit if speed of the automobile is less than an idle speed.

12. The method of claim 6, wherein the steps are implemented using a plurality of control flags, the control flags corresponding to conditions representing the state of charge, the power loading and the deceleration.

13. An apparatus for optimizing battery performance in an automobile having an alternator and a battery, comprising:

a state of charge sensor for monitoring state of charge of the battery, the state of charge sensor being coupled to the battery;

a alternator control for turning the alternator on/off, the alternator control being coupled to the alternator; and a setting control for setting state of charge limits;

the alternator being turned off if the state of charge exceeds the state of charge limits.

14. The apparatus of claim 13, further comprising:

a sensor for monitoring deceleration of the automobile, the sensor being coupled to an existing fuel injector of the automobile; and a setting control for setting deceleration limits;

the alternator being turned on if the deceleration exceeds the deceleration limits.

15. The apparatus of claim 13, further comprising:

a sensor for monitoring power loading; and a setting control for setting power loading limits;

the alternator being turned on if the power loading exceeds the power loading limits.

16. The apparatus of claim 13, further comprising:

a sensor for monitoring speed of the automobile against a cruise speed; and a setting control for setting cruise limits; and wherein the state of charge limits are set to the cruise limits if the speed exceeds the cruise speed for a preset time limit.

17. The apparatus of claim 13, further comprising a sensor for monitoring acceleration of the automobile, and wherein the alternator is turned off if the acceleration exceeds a preset limit.

18. The apparatus of claim 13, further comprising:

a sensor for monitoring speed of the automobile against an idle speed; and a setting control for setting 90-second limits; and wherein the state of charge limits correspond to 90-second limits if the speed is less than the idle speed.

* * * * *